Oct. 25, 1932.   J. G. VINCENT   1,884,410
INTERNAL COMBUSTION ENGINE
Original Filed Aug. 4, 1924   2 Sheets-Sheet 1
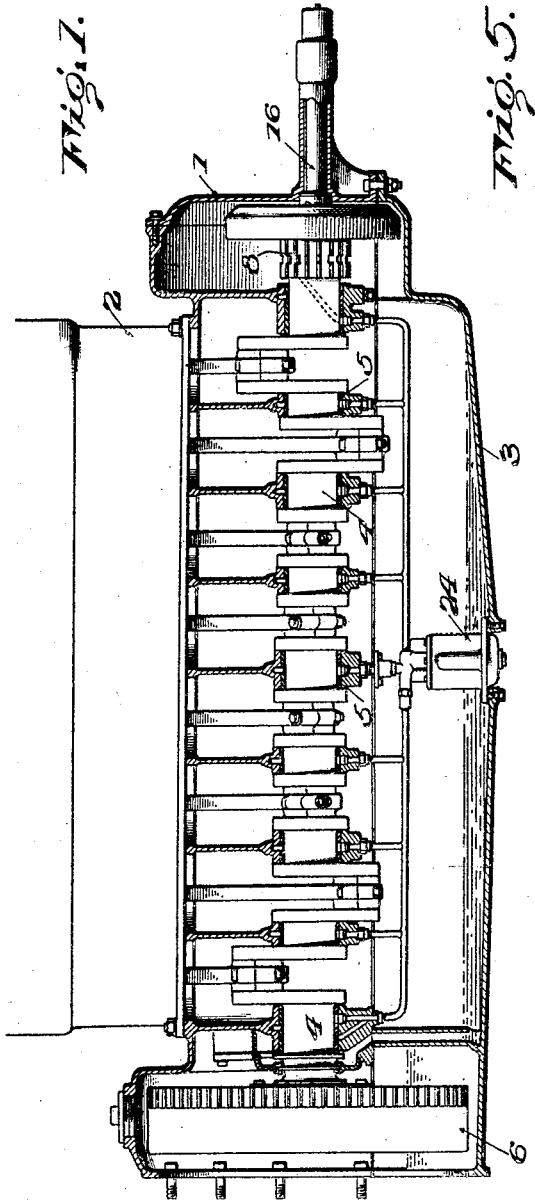
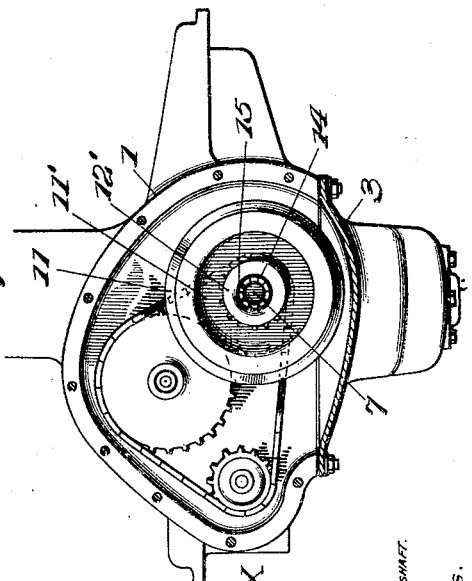
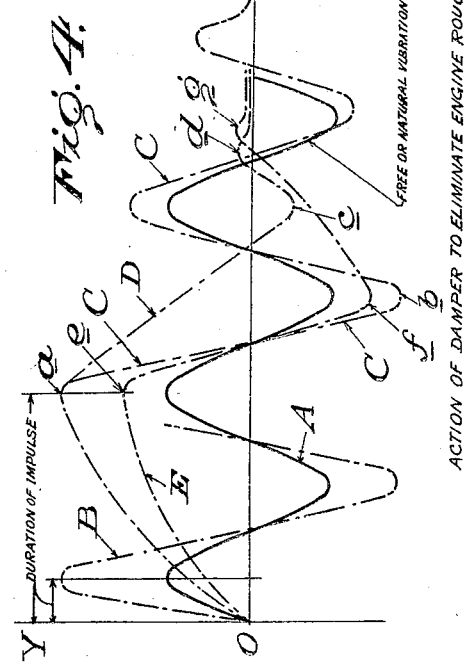

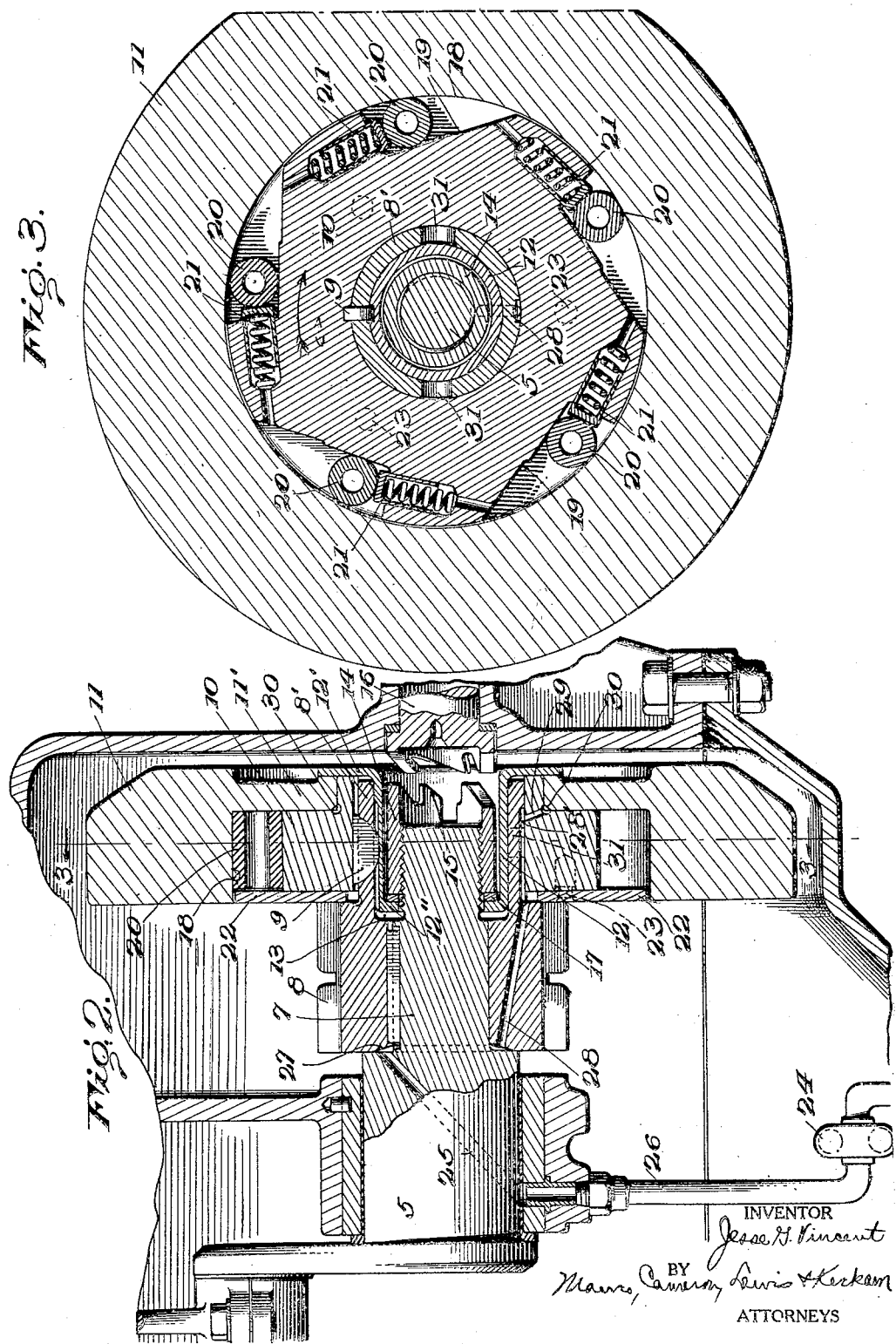

Patented Oct. 25, 1932

1,884,410

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed August 4, 1924, Serial No. 730,107. Renewed May 27, 1930.

This invention relates to internal combustion engines and particularly to the crankshafts of such engines and to means for damping the torsional vibrations in crankshafts of the general type disclosed in patent to Lanchester No. 1,085,443, dated January 27, 1914. The damper of this invention is also of the general type disclosed in my Patent No. 1,234,978, dated July 31, 1917, and in the patent to Tibbetts, No. 1,273,952, dated July 30, 1918.

The objectionable effects that are produced by the operation of an internal combustion engine which is not provided with means for damping the vibrations of the working parts, and in particular the crankshaft, are well known, but the causes thereof are sometimes misunderstood. The fundamentals of both free and forced vibrations are involved in an analysis of the situation.

Every body has a natural period of vibration and, if a vibration-producing force is applied to it, the body being unrestrained or left to itself, this period, or the time for one complete vibration, will not change and the body will continue to vibrate until the energy of the applied force is dissipated. If force is intermittently applied to a body in such a manner that the period of the force is the same as the natural period of the body, the vibrations set up by the force will be very energetic and the body is said to resound to the periodic force. If, however, the natural period of the body does not agree with the period of the force, then the vibrations set up in the body are, in general, of smaller amplitude, and they agree in period with the period of the force and not with the natural period of the body; such vibrations are called forced vibrations. If, when a body is acting with forced vibrations, the periodic force is stopped, then the body will continue to vibrate but, as stated above, the vibrations will be of the same period as the natural period of the body, and are said to be free. Vibrations may be further classified or characterized as transverse, torsional, longitudinal, etc., depending on the mode of application of the applied force.

The purpose of the vibration damper herein disclosed is to modify the forced and free torsional vibrations in the crankshaft of an engine in order to overcome the objectionable effects that result therefrom. These objectionable effects are manifested when torsional accelerations of the shaft reach or exceed a certain magnitude. When this magnitude is reached, the clearance in the various moving parts is taken up with such velocity that impacts take place between the connecting rods, wrist pins, pistons, bearings, etc., and produce objectionable noises. Two characteristic manifestations result, one of which is known as a periodic vibration at a critical speed, which is the speed of synchronized vibration in which the power impulses of the engine are timed in some multiple number with the free vibrations of the crankshaft. Such vibrations occur only at definite engine speeds, and through only short ranges of speed in the neighborhood of that speed at which synchronism exactly occurs. When the power impulses are timed exactly with the free vibration of the shaft, the maximum disturbance results since at this speed the amplitudes of the vibrations are a maximum. If no damping forces were present, these amplitudes would reach a point where the stresses set up in the crankshaft would exceed the strength of the same and rupture would result. A certain amount of damping, however, is always present due to the friction of the bearings and other moving parts, but even when the stresses produced do not result in the destruction of the mechanism, undesirable noises are produced, and the life of the mechanism is shortened.

The second manifestation of the vibrations which has characteristics different from the foregoing, is a peculiar sort of roughness or noisy engine operation that may extend over a comparatively wide range of engine speeds and which in extreme cases may extend over the entire operating range of the engine. This roughness or noisy operation becomes very great in the neighborhood of certain multiple engine speeds which are the critical speeds of the engine, and is also proportional, or approximately so, to the power developed by the engine. This phenomenon results from the fact that the crankshaft vibration is a composite one which is made up of a succession of alternate portions of forced vibrations and free vibrations, the greater the acceleration or the frequency of said vibrations, the greater the roughness and noise.

Internal combustion engines having perceptible critical speeds seldom have their primary vibration frequency lower than five thousand or six thousand complete vibrations per minute, which corresponds to a primary critical speed of twelve hundred and fifty to fifteen hundred revolutions per minute for an eight cylinder, four-stroke cycle engine. The primary critical speed for a properly designed eight cylinder engine, however, is in the neighborhood of three thousand revolutions per minute; or, in other words, the primary free vibration frequency of the crankshaft is in the neighborhood of twelve thousand complete vibrations per minute with higher harmonic vibrations of 2, 4, 8 and like times the frequency corresponding to critical speeds of one-half, one-fourth and one-eighth times the primary critical speed. Thus at fifteen hundred revolutions per minute of such engine crankshaft the vibration frequency would be twenty-four hundred complete vibrations per minute. With such high vibration frequencies, it is clear that the accelerations of free vibration are much greater than the accelerations of the forced vibrations and therefore that the engine roughness (not at critical speeds) is due to the natural frequency of the crankshaft system.

Any device which changes the energy distribution in the vibrating system may constitute a damper even though the device does not of itself dissipate the energy, but merely functions to change the mode of motion so as to permit such damping forces, as bearing friction, to effectively dissipate some of the vibration energy. In my patent referred to above, there is disclosed a vibration damper wherein an inertia member is connected to the crankshaft of the motor by means which carry said member around positively in the normal direction of rotation of the shaft but permit relative rotation between the inertia member and shaft in the reverse direction. This arrangement of the vibration damper results in a certain amount of inertia being added during a power deflection of the crankshaft, and the deflection thus produced will be somewhat reduced in amplitude with relation to that which would result if no damper had been provided; but the counter-deflection, or part of the vibration which is the backward swing after the impulse, will be unaffected as to frequency though its amplitude will be slightly decreased with relation to that which would result if no damper had been provided. The next forward swing, however, will be slower due to the inertia added by the damper. During the power deflection, the stiffness of the shaft is the dominating factor and the vibration is only slightly changed during the first backward swing from that which would result if no damper inertia were added during the period of the impulse.

In the patent to Tibbetts, No. 1,273,952, there is disclosed a similar type of vibration damper which comprises an inertia member connected to the crankshaft by means which carry the flywheel around frictionally in the normal direction of rotation but prevent relative rotation in the reverse direction. A plate or disk clutch provided with spring means for varying the amount of friction between the clutch elements constitutes the frictional means for imparting rotation, in the normal direction, to the inertia member, and a roller clutch constitutes the means for preventing relative rotation between the inertia member and the crankshaft in the reverse direction. The use of this arrangement results in a certain amount of inertia being temporarily added to the vibrating system during the recoil after the impulse. With this arrangement, the acceleration is greatly reduced, thereby increasing the time of recoil of the crankshaft and, consequently, the time for the damping forces to act. The result effected is the same as changing the frequency of the free vibration of the crankshaft during the recoil of the same after an impulse.

Thus it is apparent that with the roller clutch arranged as in the Tibbetts patent the damper begins to act on the first recoil after the impulse and in practice this damper checks some of the torsional vibrations earlier or better than does the roller clutch arrangement of my patent above referred to, and therefore makes a smoother running engine. In the Tibbetts patented construction referred to, however, it has been found that while the disc clutch arrangement shown will operate to carry the flywheel around with the crankshaft and act as described therein, yet the disc clutch of necessity is subject to wear and therefore to change in adjustment, which causes a variation in its action. Also, with the relatively large friction surface of the Tibbetts plate clutch more energy is required to initiate relative movement between the flywheel and crankshaft than is required to continue that relative movement, with a resulting variation in dampening action at different times. Moreover, under some conditions of neglect or when the engine is left standing for a long time the plate clutch is liable to stick and the flywheel be changed from a dampening member to a rigidly mounted inertia member.

One of the objects of the present invention is to provide a vibration damper for an internal combustion engine that will operate on the first recoil after the impulse and that will be uniform and reliable in action over a long period of time.

Another object of the invention is to provide an extremely simple damper construction for an internal combustion engine which will perform the two functions of the Tibbetts structure wherein a disc clutch and a roller clutch are used.

Another object of the invention is to provide a vibration damper having a clutch of the roller type that performs the two functions performed in the Tibbetts structure by the disc clutch and the roller clutch.

Another object of the invention is to provide thorough lubrication for the damping device of an engine by connection with the pressure oiling system of the engine.

Other objects and advantages of the invention will appear from the following description taken in connection with the drawings, which form a part of this specification, and in which:

Fig. 1 is a sectional side elevation of an internal combustion engine embodying the present invention;

Fig. 2 is an enlarged detail sectional view with parts broken away, of the forward end of the crankshaft and the damping device;

Fig. 3 is a sectional view taken on the line 3—3 of Fig. 2;

Fig. 4 is a comparative showing of vibration curves; and

Fig. 5 is a front elevation of the damping device.

Referring to the drawings, wherein like reference numerals refer to like parts throughout the several views, 1 is an engine crankcase to which is secured in any desired manner a cylinder block 2 and the usual bottom cover or oil reservoir 3. A crankshaft 4 is supported in suitable bearings 5 in the crankcase while the usual flywheel 6, provided to balance or smooth out the variations in power applied to the crankshaft by the pistons, is mounted on the rear end of said crankshaft. Rigidly keyed to the forward reduced end 7 of the crankshaft is a gear or sprocket 8, for driving the usual camshaft and other auxiliary mechanism of the motor, said gear being provided with a forwardly extending hub portion 8' to which is rigidly keyed, as by means of a woodruff key 9, the inner element 10 of the vibration damper. Surrounding the inner element 10 is an outer inertia element or flywheel 11 which, with the inner element 10, is retained in place relative to hub 8' by means of a retaining member 12 provided with front flange 12', and rear flange 12", which flange 12" extends into a recess 13 formed in hub 8'. A cylindrical member 14, which is provided on its outer end with clutch teeth 15 for engagement with the toothed inner end 16 of the usual starting crank, and which is interiorly threaded for engagement with the threaded end 7 of shaft 5, constitutes a lock nut which bears at its inner end against a lock washer 17 that abuts against the inner flange 12", thus locking the parts in position on the shaft 5.

The inertia member 11 is formed with an internal cylindrical surface 18 which surrounds the periphery of inner member 10. Formed in the latter are a plurality of tangential notches 19 in which are positioned rollers 20. The rollers and notches are so proportioned that the former fit loosely in the deepest part of the latter but are wedged in between the inner wall of the groove and the interior cylindrical wall 18 of the flywheel or outer member 11 when the crankshaft is rotated in one direction. Spring devices 21 shown in the form of rather heavy coiled wire springs, are positioned in the end walls of the grooves or notches 19 for engagement with the rollers to force the latter yieldingly but with some pressure into contact with the cylindrical surface 18. Sufficient tension is imposed on these springs to insure that they will cause the rollers 20 to frictionally drive the flywheel 11 in the normal direction of rotation of the crankshaft 5, and yet there will always be slip when the crankshaft is accelerated suddenly. This roller friction, with practically line contact only, insures uniform frictional resistance and little or no wear over a long period of time. An annular plate 22, which constitutes a retaining member for the rollers, is interposed between gear 8 and inner member 10. Preferably, plate 22 is provided with a dowel pin 23, which extends into an opening formed in said inner member, in order to facilitate assembly of the parts.

The parts are so formed that the flanged member 12, inner and outer members 10 and 11, the rollers 20, the spring devices 21, and retaining disk 22 may be assembled on the bench and then be placed as a unit on the hub portion 8' of gear 8. The parts are then secured in position by turning up the toothed locking member 14 against lock washer 17. Two radial openings 31 are preferably formed in hub portion 8' (Fig. 3) to receive a suitable tool for withdrawing gear 8 from the crankshaft.

The operation of the damper device is as follows:

The forces generated by the explosions in the cylinders are transmitted by the pistons and connecting rods to the crankshaft whereby the latter is rotated in the direction of the arrow, Fig. 3. All of the damping elements are positively driven by the shaft in the same direction, excepting the flywheel 11. The pressure exerted by spring devices 21 on rollers 20 is such that the flywheel is frictionally driven in the same direction, and the construction of these parts is such that the contact surfaces of the rollers and other clutch parts may be hardened whereby little or no wear takes place in their operation.

The action of flywheel 11 when operating as a damper will best be understood by referring to the curves shown in Fig. 4, wherein the full line curve A represents the fundamental free torsional vibration, or any harmonic of the fundamental, of any point on the crankshaft at some radial distance from the crankshaft axis of rotation. The curve B represents the vibration of this point at critical speeds wherein the power impulses are timed in some multiple number with the free vibrations. The curve C represents the effect of power impulse on a free vibration, no damping device being provided. Curve D represents the effect of adding inertia to the crankshaft after the impulse and during the backward swing, as in the damper device of the present invention and substantially as in the device of the Tibbetts patent; while the curve E represents the effect of adding inertia during the power impulse, as in the device of my patent above referred to.

The amplitudes of the vibrations are measured along the ordinate axis O—Y and, with respect to the abscissa axis O—X, upward ordinates are positive and indicate that the point has advanced in the direction of rotation. Downward ordinates are negative and indicate that the point lags behind or has moved in the counter direction to rotation.

The frequency of the free vibration, which is measured along the abscissa axis, is such as to produce accelerations of such magnitude as to cause a disagreeable roughness of the engine through a wide range of speeds, and particularly in the neighborhood of the critical speeds as indicated by curve B. At engine speeds other than critical, the shaft may be set vibrating as indicated by curve C. During the action of an impulse, the point on the crankshaft is deflected torsionally an amount which depends on the rigidity of the crankshaft and on the inertia of the crankshaft system, this deflection being indicated by the line O—a. This torsional impulse may result from the tangential effort of the gas pressures on the pistons, or the acceleration forces of the pistons and connecting rods generated by their reciprocating motion.

The crankshaft is deflected in a manner depending entirely on the relation of the impulse to the inertia and rigidity of the crankshaft system. At the termination of the impulse, however, the shaft immediately tends to spring back to its free position, but owing to the inertia of the system, it springs back beyond the free position as indicated by portion a—b of curve C; and hence vibrates to and fro with the characteristics of free vibration. It will be seen that that part of the curve C to the right of the point a has the same frequency as the natural or free vibration and, hence, because of the amplitudes involved, gives rise to accelerations which cause roughness.

By temporarily adding inertia to the system only during recoil and after the termination of the impulse as in the present invention, the acceleration is greatly reduced, the amplitude of vibration is reduced and the time of recoil is increased. This is indicated by curve D which coincides with curve C from O to a, because no inertia has been added to the system during the impulse. Thus, the frequency of the free vibration is changed. Inertia is added to the system during the recoil only by means of the flywheel 11. During the recoil after the termination of the impulse, there is a tendency for the crankshaft to rotate in a counter-clockwise direction, as viewed in Fig. 3, which tendency causes the rollers 20 to be wedged tightly between the outer roller race 18 of the flywheel 11 and the inner walls of the grooves 19 of the inner member 10. This is represented by the portion a—c of the curve D. The full force of the rotating flywheel is thus utilized to resist backward swing of the vibration of the crankshaft. The vibration is thereby reduced below the disturbing point and the energy of vibration of the crankshaft remaining after the first backward swing is so small that the amplitude of the succeeding forward swing as represented by portion c—d of curve D, during which the normal inertia of the system is restored, is also below the disturbing point.

If, on the other hand, the inertia is added during the power deflection of the shaft, as is the case in the vibration damping device disclosed in my patent referred to above, and which condition is represented by the portion O—e of curve E, the amplitude of vibration is reduced, but that part of the vibration which is the backward swing after the termination of the impulse and which is represented by the portion e—f of the curve E, will be unaffected as to frequency, although the amplitude will be decreased. The next forward swing as represented by the portion f—g of curve E, however, will be slower due to the inertia added by the damping flywheel.

Curve D indicates the operation of the device of the present invention and it also approximates the operation of the Tibbetts device under certain adjustments and when the disc clutch thereof is in good condition. The several curves graphically represent the results secured by the devices of the patents referred to, as well as those of the present invention in damping the vibrations of the crankshaft system.

Another feature of the invention insuring uniformity of action over long periods is the provision for ample lubrication of all the relatively moving parts. Means are provided for supplying oil under pressure from the engine lubrication system. As illustrated in Fig. 2, 24 represents an oil pump of any suitable type, here shown as of the gear variety, for supplying oil under pressure to the various bearings of the engine. The drawings illustrate this pump as being located below the front main bearing of the crankshaft, but it will be understood that it may be located at any suitable point, as for example, adjacent the longitudinal center of the oil reservoir. Formed in the crankshaft in the plane of the front main bearing is an oil duct or passage 25 which registers with the discharge pipe 26 of the pressure pump once during each revolution of the shaft. The oil is thus forced by the pump, via passage 25, which terminates in the shoulder at the reduced portion 7, to an annular oil passage 27, formed in the rear face of gear 8, which communicates with a longitudinal passage 28 that extends through gear 8 to its front face. The oil then passes through a continuation 28′, formed in hub 8′, of duct 28 to a radial passage 29 that communicates with a circular passage 30 formed in the front face and hub portion of inner member 10. Th hub portion 11′ of flywheel 11 is of such thickness that there is a clearance of .002 to .004 of an inch between its opposite faces, member 10, and the flanged retainer 12. Oil is thus forced between the member 10 and flywheel 11 to the roller grooves 19, maintaining rollers 20 as well as roller race 18, thoroughly lubricated at all times. The lubricant drains back into the oil reservoir 3 and is recirculated by the pump 24.

While for the purpose of illustration one expression of the inventive idea has been herein shown and described in detail, it is to be understood that the invention is not limited thereto, and that the inventive idea may be embodied in various mechanical expressions within the limits of the appended claims.

For example the rollers 20 may be obviously be either cylindrical or of the ball type, and the inclined clutching surfaces may be formed in the flywheel 11, instead of on the inner member 10.

What is claimed is:—

1. A device of the class described comprising, in combination, a power shaft, a gear having a forwardly extending hub portion mounted on said shaft, a member secured to said hub portion, a flywheel surrounding said member, and roller clutch means for frictionally driving said flywheel in the direction of normal rotation of said power shaft.

2. A device of the class described comprising, in combination, a power shaft, a gear having a forwardly extending hub portion mounted on said shaft, a member secured to said hub portion, a flywheel surrounding said member, means for retaining said flywheel in opreative relation with said member, and a clutch mechanism for frictionally rotating said flywheel in the direction of normal rotation of said shaft and for positively preventing relative rotation between said member and flywheel in the opposite direction.

3. In combination, a power shaft having an oil passage therein, a gear on said shaft provided with an oil passage in communication with said shaft passage, a member secured to said gear having an oil duct in communciation with said passages, which duct leads to an annular groove in the face of said member, a flywheel surrounding said member and having a portion covering said grooves, and roller clutch means between said member and flywheel.

4. In combination, a power shaft provided with a reduced portion at its forward end and having an oil passage which terminates in the face of the shoulder formed by said shaft and reduced portion, a gear provided with a groove in its rear face mounted on said reduced portion in engagement with said shoulder whereby said groove constitutes an oil passage in communication with said first-named passage and with a longitudinal passage extending through said gear, an inner member secured to said gear and provided with an oil duct in communication with said passages, a flywheel on said inner member, roller clutch means between said inner member and flywheel, and pressure means for forcing lubricant through said passages and duct to said clutch means.

5. In combination, a power shaft subject to torsional vibration, an inertia member supported for rotation with respect to said shaft, means including rollers and cooperating clutch surfaces interposed between the shaft and interia member and preventing relative rotation therebetween in one direction, and means for pressing said rollers into frictional contact with the clutching surfaces to transmit the sole driving torque to the inertia member in the other direction.

6. In combination, a power shaft subject to torsional vibration, an inertia member supported for rotation with respect to said shaft, a spring-loaded roller clutch acting between the shaft and inertia member and preventing relative rotation therebetween in one direction, said spring developing friction in said clutch to transmit the sole driving torque to the inertia member in the other direction.

7. In an internal combustion engine, the combination with the crankshaft having a flywheel rigidly secured at one end, of an inertia member at the other end of the shaft, clutch means including clutch surfaces and cooperating clutch rollers spaced at equal distances about the inertia member and preventing relative rotation between the shaft and said member in one direction, and means for engaging the rollers with the clutch surfaces to transmit the sole driving torque to the inertia member in the other direction.

8. In an internal combustion engine, the combination with the crankshaft having a flywheel rigidly secured at one end, of an inertia member at the other end of the shaft, roller clutch means including clutch surfaces and cooperating clutch rollers for preventing relative rotation between the shaft and said member in one direction, and spring means for engaging the rollers of said clutch means with the clutch surfaces to transmit the sole driving torque to the inertia member in the other direction.

9. In a device of the character described, a power shaft, a member connected with the power shaft to rotate therewith, a flywheel surrounding the member and freely rotatable thereon, roller clutch means interposed between the member and the flywheel for frictionally driving the latter in the direction of normal rotation of said power shaft, and means for retaining the roller clutch means in position and secured to said member.

10. In a device of the character described, a power shaft, a gear thereon, a member connected with the power shaft to rotate therewith, a flywheel surrounding the member and freely rotatable thereon, roller clutch means interposed between the member and the flywheel for frictionally driving the latter in the direction of normal rotation of said power shaft, and retaining means extending between said gear and said member and secured to said member for holding the roller clutch means in position.

11. In a device of the character described, a power shaft, a gear thereon, a member connected with the power shaft to rotate therewith, a flywheel surrounding the member, roller clutch means including a clutching roller interposed between the member and the flywheel for frictionally driving the latter in the direction of normal rotation of said power shaft, and retaining means bearing against and interposed between the gear and the member for holding the roller in position.

12. In a device of the character described, a power shaft, a gear thereon, a member connected with the power shaft to rotate therewith, a flywheel surrounding the member, pockets in the member, and a clutching roller in the pockets and engaging the flywheel to frictionally drive the latter in the direction of normal rotation of said power shaft, said pockets being free of lubricating devices therein and said roller being lubricated from a source externally of the pockets.

13. In a device of the character described, a power shaft, a rotatable member, a flywheel member surrounding the rotatable member, pockets formed in one of said members and free from lubricating elements therein, a source of lubricant, clutch elements arranged in the pockets in engagement with the flywheel and lubricated externally from said source, and connections between said member and the power shaft for driving the flywheel in the normal direction of rotation of said shaft through said clutch elements.

14. In a vibration damper for crankshafts, the combination with an inertia member supported for rotation with respect to the shaft, of a single clutch device drivingly connecting said shaft and member for preventing overrunning of said inertia member with respect to the normal direction of said shaft and for frictionally coupling said shaft and inertia member to effect the sole driving connection for the latter from said shaft, whereby said inertia member may be frictionally coupled to said shaft when impulses are applied to the latter in a forward direction, and locked to said shaft during the subsequent recoil of the latter in a reverse direction.

15. In a vibration damper for crankshafts, the combination with an inertia member supported for rotation with respect to the shaft, of roller clutch means acting between said inertia member and said shaft for preventing overrunning of said inertia member with respect to the normal direction of said shaft and for frictionally coupling said shaft and inertia member to effect the principal driving connection for the latter from said shaft, whereby said innertia member may be frictionally coupled to said shaft when impulses are applied to the latter in a forward direction, and locked to said shaft during the subsequent recoil of the latter in a reverse direction.

16. In a vibration damper for crankshafts, the combination with an inertia member supported for rotation with respect to the shaft, of clutch means acting between said shaft and said inertia member to prevent overrunning of the latter with respect to the normal direction of rotation of the shaft, said clutch means forming the principal driving connection between said shaft and said inertia member and comprising relatively inclined surfaces associated respectively with the shaft and inertia member, and an element yieldably urged into wedging engagement with said surfaces with sufficient force to effect a driving connection therebetween, whereby said inertia member may be frictionally coupled to said shaft when impulses are applied to the latter in a forward direction, and locked to said shaft during the subsequent recoil of the latter in a reverse direction.

17. In a vibration damper for an elastic rotating body subjected to successive applied torsional impulses tending to rotate the same, the combination with an inertia member mounted for rotation with respect to the body, of clutch means including a wedge device acting between said body and inertia member and constituting the principal driving connection for effecting rotation of the latter from the former, said wedge device locking said body and inertia member when the latter tends to overrun the former, and resilient means exerting sufficient force on said wedge device to effect a frictional driving connection between said body and inertia member when the latter lags the former.

In testimony whereof I have signed this specification.

JESSE G. VINCENT.